United States Patent [19]
Cook

[11] 3,938,266
[45] Feb. 17, 1976

[54] ADHESIVE SYSTEM

[75] Inventor: Melvin S. Cook, Saddle River, N.J.

[73] Assignee: Holobeam, Inc., Paramus, N.J.

[22] Filed: Dec. 13, 1973

[21] Appl. No.: 424,274

[52] U.S. Cl. .................. 36/19.5; 156/584; 156/344
[51] Int. Cl.² ....................... A43B 9/12; B32B 00/00
[58] Field of Search........... 36/2.5 R, 19.5; 156/276, 156/279, 584, 344

[56] References Cited
UNITED STATES PATENTS

| | | | |
|---|---|---|---|
| 1,589,564 | 6/1926 | Robinson | 156/344 |
| 2,323,325 | 7/1943 | Hart et al. | 36/19.5 |
| 3,177,597 | 4/1965 | Davis et al. | 36/19.5 |
| 3,271,236 | 9/1966 | Badie | 156/584 |
| 3,574,031 | 4/1971 | Heller et al. | 156/276 |
| 3,657,038 | 4/1972 | Lightfoot | 156/276 |

*Primary Examiner*—Patrick D. Lawson
*Attorney, Agent, or Firm*—Stanley J. Yavner

[57] ABSTRACT

An adhesive system is described as including an adhesive having dispersed metal particles whose function it is to emit heat for the purposes of breaking the bond formed by the adhesive when such action is desired. Specifically, metal particles are embedded within a suitable adhesive material which loses strength at a predetermined, relatively low temperature. When it is desired to break the bond formed by the adhesive, the metal-filled adhesive is placed in a rapidly varying magnetic or electromagnetic field so that the metallic inclusions transfer heat to the adhesive material, thereby raising it to a level which will break the bond formed thereby.

1 Claim, 5 Drawing Figures

ADHESIVE SYSTEM

This invention relates primarily to adhesive systems and more particularly to such systems whose bond may be selectively destroyed or weakened.

Adhesives of high adhesive strength form bonds which are considered permanent. Such bonds may only be destroyed by the addition of chemical solvents or heating which also serve to destroy the materials connected by the adhesive. For many years now, designers in many product fields have sought an adhesive having permanent strength characteristics and yet whose bond may be weakened or destroyed without affecting more than a narrow zone encompassing the bonded areas.

For instance, with shoe products, it would be particularly advantageous to connect the sole of a shoe to the upper thereof, such that when the sole becomes worn, the adhesive connecting it to the upper of the shoe can be removed without destruction of the shoe upper. Typically, shoe soles are bonded to shoe uppers by means of a non-permanent adhesive and/or stitching, both of which tend to give way easily during normal wear. For instance, it is not uncommon for a shoe sole to separate from the shoe upper because of the wearing and breaking of the thread connecting them.

Accordingly, a primary object of the present invention is to provide an adhesive system for bonding two items with what is commonly considered a permanent bond, and yet which bond may be weakened or destroyed when it is desired to separate the items.

A further and more particular object is to provide an adhesive system which is useful in permanently bonding shoe soles to shoe uppers in such a way that the bond may be broken without destroying the upper of the shoe.

These and other objects are accomplished in one illustrative embodiment of the invention which features an adhesive material having permanent adhesive characteristics for bonding two items. Dispersed throughout the adhesive material are a plurality of energy absorbing elements whose heat is used to weaken the adhesive characteristics of the adhesive material. Specifically, metallic inclusions dispersed throughout the adhesive material are used to heat the adhesive material thereby to weaken or destroy the bond formed by the material. A coil surrounding the adhesive material and its metallic inclusions provides a rapidly varying magnetic or electromagnetic field whose energy is absorbed by the metal and transferred to the adhesive material, thereby to weaken or destroy its bond by heating. Such a system is not subject to the deficiencies of the existing systems, so that the items bonded by the adhesive material are preserved throughout the adhesive destruction process.

The above brief description, as well as further objects, features and advantages of the present invention will be more fully appreciated by reference to the following detailed description of the preferred, but nonetheless illustrative, embodiment, when taken in conjunction with the accompanying drawings, wherein.

Figure 1:
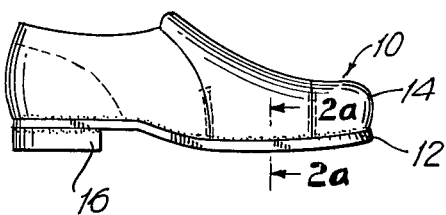
FIG. 1 is a side view of a typical shoe shown to illustrate a preferred application of the present invention.
Figure 2A:
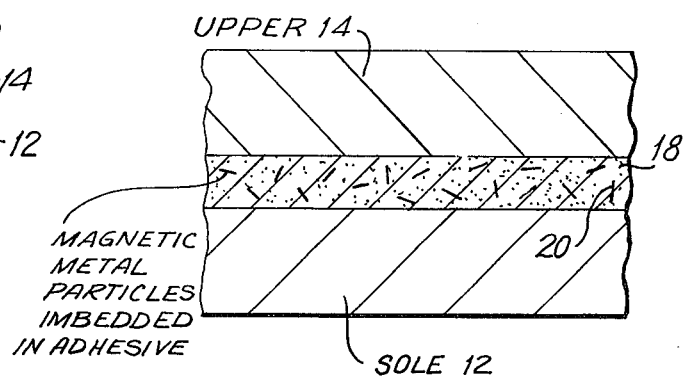
FIG. 2a is an enlarged, sectional representation of a portion of the shoe of FIG. 1 taken along the line 2a—2a of that FIG. and illustrating the bonding of a shoe sole and shoe upper by means of an adhesive system according to the present invention.
Figure 3:
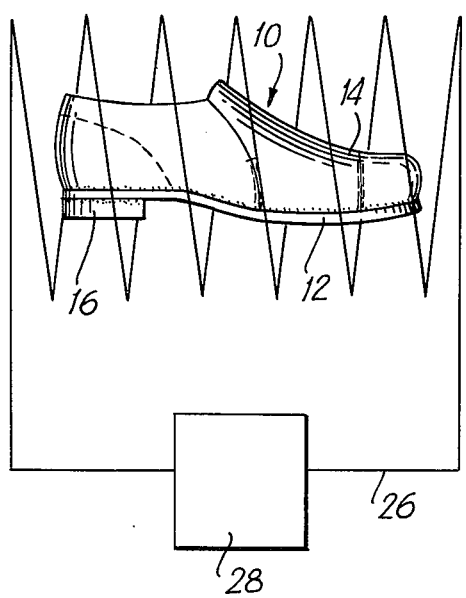
Figure 2B:
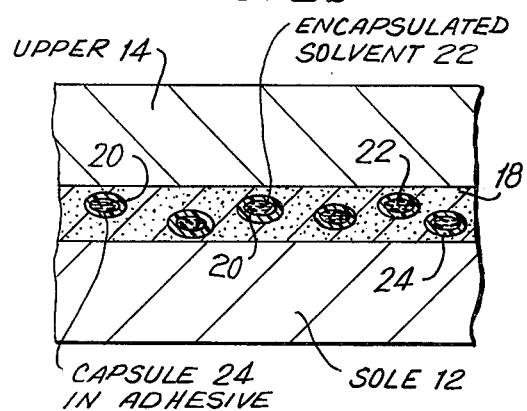
FIG. 2b is a sectional representation, similar to FIG. 2a, but alternatively illustrating the use of energy absorbing capsules to encapsulate an adhesive destroying solvent.
Figure 4:
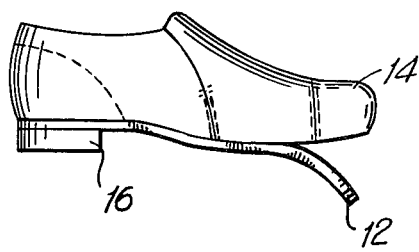

FIG. 3 is a schematic representation of the shoe of FIG. 1 surrounded by a coil connected to a source of a varying magnetic field to be used with the system illustrated in FIG. 2a or connected to any source of energy to be used with the system illustrated by FIG. 2b; and FIG. 4 is a view similar to that of FIG. 1 but showing the result of adhesive destruction which enables removal of the shoe sole without destruction of the shoe upper.

Referring to the drawings, FIG. 1 illustrates a typical shoe construction, generally designated 10 which includes shoe sole 12, shoe upper 14 and heel 16. As stated previously, shoe upper 14 is usually attached to sole 12 by means of a non-permanent adhesive and additionally stitching or stapling, which bonding system is subject to the wear drawbacks previously recited. According to the present invention, a permanent adhesive 18, as shown in FIG. 2a is used to bond upper 14 to sole 12 by means well known in the art. However, a plurality of metal particles 20 are dispersed throughout adhesive 18, with such particles having sufficient electrical conductivity and/or permeability to be used as will be described herein.

Alternatively, it is suggested that a solvent be dispersed and mixed throughout the adhesive for actuation thermally by heat being absorbed by metal particles 20, also dispersed throughout the adhesive material 18. However, the control of such solvent is more difficult in terms of a substantially homogeneous mixture than would be the simple use of metal particles.

By using capsules 24 as shown in FIG. 2b to encapsulate solvent 22 and metal particles 20 to absorb energy and give off heat, the effect of heating can be much more easily controlled. For instance, if capsule 24 is comprised of a thermoplastic material which absorbs heat and thereby releases the solvent, the effect on the shoe is much less and the desirable limited zone of affected area much more controllable.

Specifically, it is recommended that the following materials be used as metallic inclusions 20 for adhesive material 18:

1. Purified iron — 99.9% or lower
2. Permendur — 49.7% Fe, 50% Co, .3% Mn
3. 2V Permendur — 49% Fe, 49% Co., 2% V
4. 45 Permalloy — 54.7% Fe, 45% Ni, .3% Mn Of the above, Permendur is preferred since it has the highest hysteresis loss in ergs/cm$^3$/cycle. However, iron is less expensive, even in the purified form, and therefore would be useful for that reason in many more applications.

The following table shows the hysteresis loss comparison for the above mentioned metallic fillers in terms of saturation flux density (B in Gauss), coefficient of hysteresis ($\nu$) and Hysteresis loss ($W_h$ in ergs/cm$^3$/cycle), where $W_h = \nu B^{1.6}$ and 1 Gauss = 1 Maxwell/cm$^2$:

| B | $\eta$ | Material | $W_h$ |
|---|---|---|---|
| 21,500 | 0.59 × 10$^{-3}$ | Purified Iron | 5,000 |
| 24,500 | 1.15 × 10$^{-3}$ | Permendur | 12,000 |
| 24,000 | 0.675 × 10$^{-3}$ | 2V Permendur | 6,000 |
| 16,000 | 0.226 × 10$^{-3}$ | 45 Permalloy | 1,200 |

FIG. 3 shows a shoe 10 with upper 14 bonded to sole 12 by either the construction of FIG. 2a or the construction of FIG. 2b. Coil 26 is used in connection with an alternating electric current source 28 to generate a varying electromagnetic field in which shoe 10 is situated. Coil 26 provides energy so that particles 20 can absorb energy from the field and give off heat. When sufficient energy is absorbed and enough heat is generated thereby, adhesive 18 loses strength and the bond is easily broken by a modest application of force. Likewise, using the system of FIG. 2b, metal particles 20 absorb energy from coil 26 and serve to heat capsules 24, which, in turn, are melted or weakened so that, e.g., mechanical force (such as in flexing a shoe) can break the capsules to release solvent 22. Solvent 22, by chemical action, then breaks the bond of adhesive material 18.

In order to complete an understanding of the present invention, a series of typical construction and operational steps will now be described.

Using the shoe product field as a typical application of the present invention, by way of example only, a shoe upper is constructed in the usual manner and a sole 12 is attached to the upper by means of an adhesive system such as that shown in FIG. 2a, wherein the adhesive material 18 has dispersed therethrough particulate metal 20. The metal may be of any of the specific materials recommended previously in this application as well as others not mentioned. The adhesive can be chosen from the following group or any other suitable adhesive:

1. Eastman 910 (cyanoacrylate)
2. Eccobond 90H (rubber base adhesive)
3. Eccobond 24 or 45 (epoxy resin systems)

One of the best of the above recommendations is Eccobond 90H since it loses strength at a reasonably low temperature of about 200°F. The other recommendations require about 250°F.

If it is desired to break the bond shown by the representation of FIG. 4, wherein sole 12 is easily pulled away from upper 14, the system of FIG. 3 is useful. A source of energy 28 is connected to coil 26 which surrounds shoe 10. The energy causes particles 20 to emit heat, thereby weakening the strength of adhesive material 18 and enabling the action represented by FIG. 4.

By use of the present invention, an adhesive system for bonding two items with what is commonly considered a permanent bond, and yet which bond may be weakened or destroyed, is provided. Such bond may be weakened or destroyed without any significant effect on the items bonded.

What is claimed is:

1. An adhesive system for bonding two items comprising an adhesive material having permanent adhesive characteristics and which loses adhesive strength when heated, electro-magnetic energy absorbing elements in the form of metal particles imbedded in said material, capsules for enveloping said elements and an adhesive weakening solvent disposed within said capsules with said elements, said energy enabling weakening of said adhesive characteristics to break said bond.

* * * * *